United States Patent
Gomez et al.

[15] 3,674,153
[45] July 4, 1972

[54] BYPASS FILTER ASSEMBLY AND METHOD OF OBTAINING A FILTERED SAMPLE

[72] Inventors: Ray J. Gomez, Arcadia; Kenneth B. Sawa, Yorba Linda, both of Calif.

[73] Assignee: Beckman Instruments, Inc.

[22] Filed: Sept. 25, 1970

[21] Appl. No.: 75,355

[52] U.S. Cl. .............................. 210/409, 210/433, 210/445
[51] Int. Cl. .................................. B01d 35/22, B01d 31/00
[58] Field of Search ................... 210/23, 321, 404, 433, 445, 210/447, 450, 453, 456

[56] References Cited

UNITED STATES PATENTS

| | | | |
|---|---|---|---|
| 3,133,132 | 5/1964 | Loeb et al. | 264/49 |
| 3,399,972 | 9/1968 | Skeggs et al. | 210/321 X |

OTHER PUBLICATIONS

Mahjikian et al., " Improvement in Fabrication Techniques for Reverse Osmosis Desalination Membranes," from Proceedings of the First International Symposium on Water Desalination, pp. 159, and 161–164 relied on

*Primary Examiner*—Frank A. Spear, Jr.
*Attorney*—Thomas L. Peterson and Robert J. Steinmeyer

[57] ABSTRACT

A bypass filter assembly and method of obtaining a filtered sample from a process stream or the like in which the process stream is introduced into a filter chamber so as to produce a symmetrical bifurcated flow pattern of fluid therein which promotes a counter-rotating scouring or cleaning action on the membrane filter in the chamber. The housing of the assembly is divided into two sections. The inlet and outlet ports for the process stream and the filtered sample port are all located in one section of the housing so that the other section, namely the filter cap, may be removed from the first section without disconnecting any flow lines from the cap, thus facilitating rapid removal of the cap and replacement of the filter element therein.

5 Claims, 5 Drawing Figures

PATENTED JUL 4 1972      3,674,153

*INVENTORS*
RAY J. GOMEZ
KENNETH B. SAWA

BY *Thomas L. Peterson*

ATTORNEY

INVENTORS
RAY J. GOMEZ
KENNETH B. SAWA
BY *Thomas L. Peterson*
ATTORNEY

BYPASS FILTER ASSEMBLY AND METHOD OF OBTAINING A FILTERED SAMPLE

BACKGROUND OF THE INVENTION

1. Field of the Invention

This invention relates generally to filters and, more particularly, to a bypass filter assembly and method of obtaining a filtered sample from a process stream or the like.

2. Description of the Prior Art

A basic requirement of all analytical instrumentation is that the sample to be analyzed must be properly conditioned prior to introduction thereof into the instrument. A prime requisite for sample conditioning systems is the removal of particulate material such as rust, iron sulfide, catalyst dust, etc., to prevent plugging of sample lines and damage to the instrument.

Heretofore, bypass filters utilized in connection with analytical instrumentation have generally been of the low washing action type in that the filter elements positioned therein were not subjected to sufficient turbulent washing action. As a result, the filter elements had to be continually replaced because of clogging due to the particles contained in the process stream, thus causing an excessive pressure drop in the flow system.

U.S. Pat. No. 3,459,307 to Collins discloses a bypass filter assembly in which the process stream is introduced tangentially into the cylindrical chamber of the assembly thereby creating a turbulent flow of the stream within the chamber for the purpose of providing a self-cleaning action on the filter element therein. The purpose of the instant invention is to produce a different form of turbulent flow within a bypass filter assembly so as to achieve a self-cleaning action of the filter element in the assembly which is at least as effective as, if not better than, that achieved in the aforementioned Collins filter assembly. In addition, the Collins bypass filter requires the removal of a sample line from the filter cap in order to gain entrance to the interior of the assembly to replace the filter element therein. This requires a substantial delay and inconvenience to the operator and, therefore, it is another purpose of the present invention to provide a filter assembly in which it is not necessary to remove any lines from the filter cap thereof.

SUMMARY OF THE INVENTION

According to the principal aspect of the present invention, there is provided a bypass filter assembly and method of obtaining a filtered sample from a process stream or the like in which the process stream is introduced into a filter chamber so as to produce a symmetrical bifurcated flow pattern of fluid therein which promotes a counter rotating scouring or cleaning action on the membrane filter in the chamber. According to another aspect of the invention, the filter housing is divided into two sections. The inlet and outlet ports for the process stream and the filtered sample port are all located in one section of the housing so that the other section, namely the filter cap, may be removed from the first section without disconnecting any flow lines from the cap, thus facilitating rapid removal of the cap and replacement of the filter element therein.

DESCRIPTION OF THE PREFERRED EMBODIMENT

Figure 1:
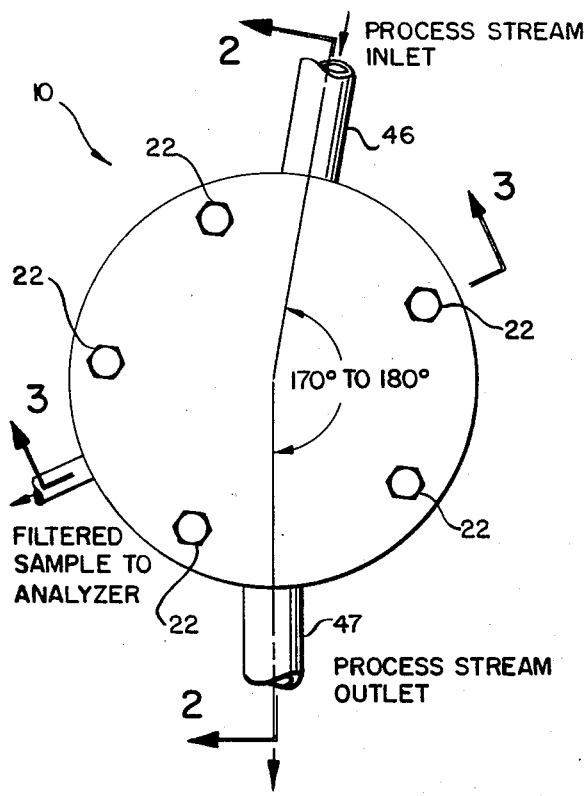
FIG. 1 is a top plan view of the bypass filter assembly of the present invention.

Referring now to the drawings in detail, the bypass filter assembly of the present invention, generally designated 10, comprises a cylindrical housing 12 which is divided into two separate sections, namely a filter body 14 and filter cap 16. These two sections are held together at mating surfaces 18 and 20, respectively, by means of a plurality of bolts 22.

A cylindrical chamber 24 is formed in the body 14 and opens at the surface 18. The bottom of the chamber 24 provides a flat end wall 26. This wall is generally parallel to the opposite end wall 28 of the chamber which is provided by the inner face of the cap 16. An axially extending annular shoulder 30 is formed on the body 14 adjacent its inner periphery and extends toward the cap 16, but terminates short of the end wall 28. A flat circular filter element 34 is positioned between the body 14 and the cap 16. As can be seen, the filter element 34 lies generally parallel to the end walls 26 and 28 of the cylindrical chamber 24.

Figure 2:
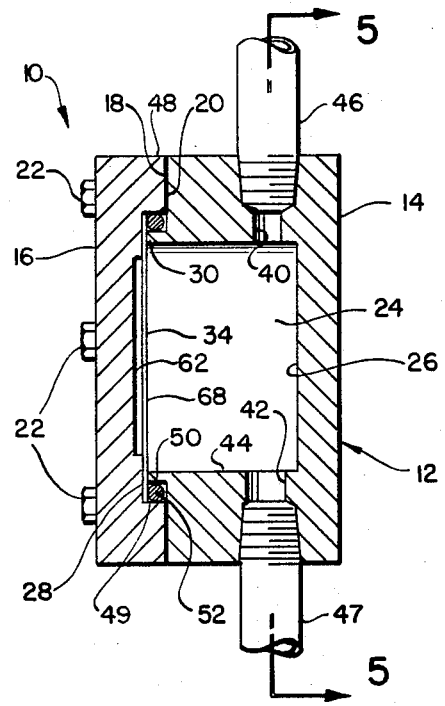
FIG. 2 is a sectional view taken along line 2—2 of FIG. 1.

Inlet and outlet ports 40 and 42, respectively, are provided in the wall of the filter body 14 to provide communication between the cylindrical inner wall 44 of the chamber 24 and the exterior of the housing. An inlet line 46 is connected to the port 40 for conveying a process stream into the chamber 24 while an outlet line 47 is connected into the outlet port 42 so as to permit the process stream to exit from the chamber. As can be seen in FIG. 2, the outlet port 42 has a greater cross-sectional area than the inlet port 40 so as to prevent a back pressure from being built up within the housing 12.

Figure 3:
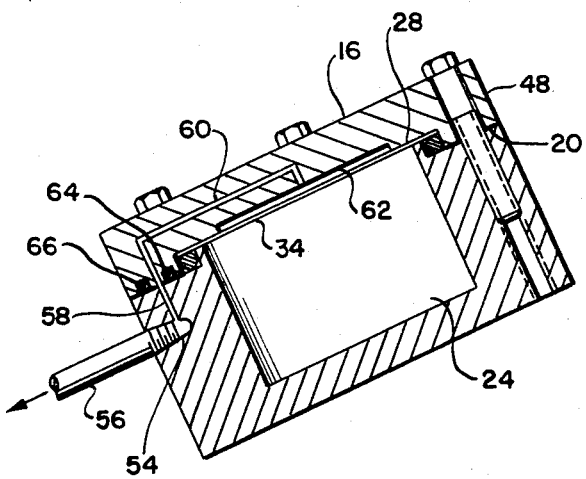
FIG. 3 is a sectional view taken along line 3—3 of FIG. 1.
Figure 4:
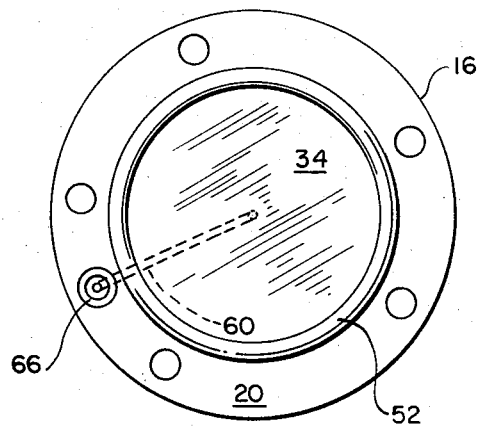
FIG. 4 is a plan view of the inner face of the filter cap utilized in the assembly shown in FIG. 1.

As can best be seen in FIG. 3, the surface 20 on the filter cap 16 is provided by an annular projection 48 that extends axially outwardly from the inner face 28 of the cap. The inner cylindrical surface 49 of this projection is spaced radially outwardly from the outer cylindrical surface 50 of the shoulder 30 on the filter body 14, thereby defining therebetween an annular space for holding an elastomeric sealing ring 52. The thickness of the sealing ring 52 is greater than the length of the shoulder 30 on the filter body 14 so that when the filter cap 16 is secured to the body 14 by means of the bolts 22, the sealing ring 52 will engage the filter element in sealing relationship and hold it firmly in place within the housing. In addition, the sealing ring 52 assures that there will be no leakage of fluid out of the housing 12 between the mating surfaces 18 and 20 of the body and cap, respectively.

According to one feature of the invention, the sample port 54 of the housing is located in the cylindrical wall of the filter body 14. A line 56 is connected to the sample port for delivering filtered sample to an instrument (not shown) for analysis. The port 54 communicates by means of a bore 58 to the surface 18 of the filter body 14. The bore 58 is in registry with a sample passage 60 which extends from the surface 20 on the cap 16 to the bottom and center of a circular recess 62 formed in the inner surface 28 of the filter cap. An annular groove 64 surrounds the sample passage 60 at its opening at the surface 20. An annular sealing ring 66 is located in this groove to provide a seal between the mating surfaces 18 and 20 of the filter body 14 and cap 16, respectively, so that there will be no loss of sample fluid passing through the passage 60, bore 58 and port 54. With the process stream inlet and outlet lines 46 and 47, respectively, and the sample line 56 all connected to the filter body 14, it can be appreciated that the filter cap 16 may be rapidly removed from the body by removing the bolts 22 without uncoupling any lines from the cap. Thus, the filter element 34 in the cap 16 may be rapidly and easily replaced, without the time consuming and inconvenient requirement of uncoupling any lines from the cap as is required in previous bypass filters.

Figure 5:
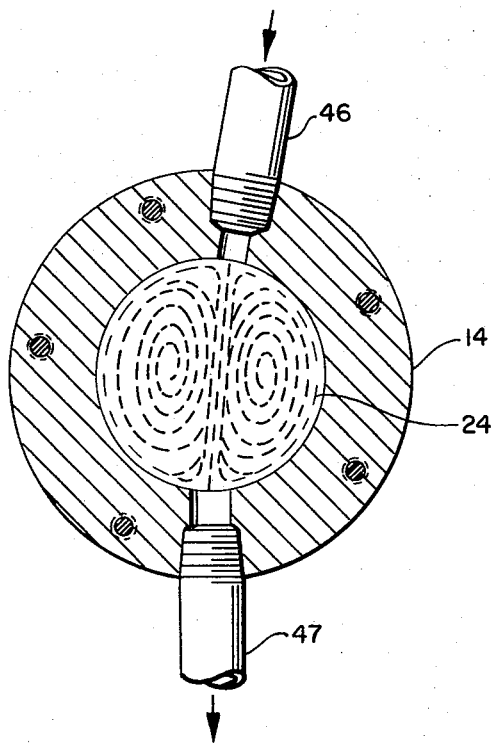
FIG. 5 is a sectional view taken along line 5—5 of FIG. 2 showing the symmetrical bifurcated flow pattern of fluid in the assembly which is achieved in accordance with the instant invention.

As will be seen from FIGS. 1 and 5 of the drawings, the bolts 22 are located in a nonuniform manner about the periphery of the housing 12 so that the cap 16 may be mounted onto the filter body 14 in only one position. In this position the sample passage 60 in the cap is in registry with the bore 58 connected to the sample outlet port 54 in the body 14. This arrangement eliminates the possibility of the filter cap 16 being improperly positioned on the body 14.

According to another feature of the invention, the inlet port 40 in the filter body 14 is directed generally toward the center of the cylindrical chamber 24 so that there will be achieved a generally symmetrical bifurcated flow of process stream within the chamber as shown by the pattern lines appearing in FIG. 5. Preferably the outlet port 42 lies in the same plane as inlet port 40 and is displaced about 170° to 180° from the inlet port. The filter element 34 lies in a plane which is generally parallel to the plane in which the inlet port 40 and outlet port 42 lie. Thus, a symmetrical bifurcated flow of fluid is created adjacent to the filter element. This flow of fluid promotes a counter-rotating scouring or cleaning action on the inner face 68 of the filter element. This turbulent flow of the process stream adjacent to the filter element has been found to effectively prevent a build-up of particles on the element by flushing the particles away before they can cause excessive pressure drops across the element, thus greatly extending the life of the element.

It has been found that when passing a gaseous process stream or liquid hydrocarbon stream through the filter assembly of the present invention employing therein a filter element having a pore size of less than 0.8 microns, the filter element will effectively prevent the passage therethrough of free water droplets which exist in the stream. The water droplets will collect on the inner surface 68 of the filter element. The turbulent flow of the process stream within the chamber 24 will carry away these free water droplets as well as remove a majority of particulate matter which becomes entrained on the surface of the filter element. On the other hand, when the process stream is water, the filter will remove particulate matter only from the water and will permit the water to pass therethrough. Thus, the filter assembly of the present invention is effective for removing both water particles and particulate matter from gaseous streams and liquid hydrocarbon streams from which a sample is desired and also is useful for removing particulate matter from water process streams from which there is desired to be drawn a clean liquid water sample for analysis.

In order to establish the effectiveness of the self-cleaning action achieved by producing a symmetrical bifurcated flow of process stream in accordance with the present invention, an assembly as described herein was connected in parallel with a bypass filter as disclosed in the aforementioned Collins patent to a common source of clean, white gasoline. Identical Millipore MF, 0.5 micron pore size filter elements were employed in the two assemblies. The gasoline was passed through the assemblies at a flow rate of about 1 gram per minute and the following materials were added to the gasoline at 5-hour intervals, in sequence:

5 grams Arizona road dust
2 grams talcum powder
2 grams graphite powder
3 grams calcium carbonate (chalk)
6 grams soda lime It was found that no significant change in the pressure drop across either of the filter assemblies occurred as a result of adding the above materials to the gasoline. This establishes that the turbulent flow produced in the assembly of the instant invention is as effective as that produced in the Collins bypass filter assembly to remove the aforementioned particulate materials from the filters employed in the assemblies. In addition, samples were taken from the sample line of each of the filter assemblies and it was determined by visual examination that the samples were equally clean, i.e., free of any particulate material.

Later, 5 grams of Molykote "G" $MoS_2$ paste, a grease-like material, was added to the white gasoline and passed through the two filter assemblies. Over a period of 75 minutes, the pressure drop across the assembly of the instant invention increased from 1.7 psig to 11.6 psig while the pressure drop across the Collins bypass filter assembly increased from 1.7 psig to 17.1 psig. The substantial increase in pressure drop across the latter assembly shows that the filter element therein was essentially clogged. Thus, it is concluded that with a grease-like material in the process stream, the symmetrical bifurcated flow of process stream within the filter assembly of the instant invention achieves a more effective cleaning action of the filter element therein than is achieved in the Collins filter assembly in which the process stream enters tangentially into the filter chamber to produce a swirling action.

Thus, by the present invention there is provided an improved bypass filter assembly which is simple in construction, easy to disassemble to replace the filter element therein, and does not suffer from a build-up of particulate matter on the filter element for extended periods of time.

Although only a single embodiment of the invention has been disclosed herein for purposes of illustration, it will be understood that various changes can be made in the form, details, arrangement and proportions of the various parts in such embodiment without departing from the spirit and scope of the invention as defined by the appended claims.

What is claimed is:

1. A bypass filter assembly for obtaining a filtered sample from a process stream or the like comprising:
    a housing having a cylindrical chamber therein with generally flat walls at opposite ends thereof, said walls being generally parallel to each other;
    said housing having inlet and outlet ports therein opening at the cylindrical wall of said chamber adjacent to one of said end walls for passing a process stream through said chamber;
    said ports being disposed generally opposite to each other in substantially the same plane, said plane lying generally parallel to said end walls;
    said inlet port being directed generally toward the center of said chamber;
    a generally flat filter lying adjacent and parallel to the other end wall; and
    a sample passage in said housing opening at said other end wall and communicating with the exterior of said housing.

2. A bypass filter assembly for obtaining a filtered sample from a process stream or the like comprising:
    a housing having a cylindrical chamber therein;
    inlet and outlet ports in said housing opening at the cylindrical wall of said chamber, said ports being disposed generally opposite to each other in substantially the same plane and said inlet port being directed generally toward the center of said cylindrical chamber so that process stream discharging through said inlet port into said chamber will flow in a generally symmetrical bifurcated flow pattern within the chamber;
    a filter positioned adjacent to one side of said chamber and disposed generally parallel to said plane whereby said process stream will flow in said pattern over one surface of said filter; and
    a sample passage in said housing communicating the other surface of said filter to the exterior of said housing.

3. A filter assembly as set forth in claim 2 wherein said outlet port is larger than said inlet port.

4. A filter assembly as set forth in claim 2 wherein said inlet and outlet ports are displaced from one another approximately 170° to 180°.

5. A filter assembly as set forth in claim 2 wherein the pore size of said filter is less than 0.8 microns.

* * * * *